United States Patent [19]
Oda

[11] Patent Number: 5,012,097
[45] Date of Patent: Apr. 30, 1991

[54] RADIATION MEASURING APPARATUS
[75] Inventor: Minoru Oda, Hyogo, Japan
[73] Assignee: Mitsubishi Denki Kabushiki Kaisha, Tokyo, Japan
[21] Appl. No.: 372,769
[22] Filed: Jun. 29, 1989
[30] Foreign Application Priority Data
  Oct. 7, 1988 [JP] Japan .................. 63-253174
[51] Int. Cl.$^5$ .................. G01T 1/17; G01T 1/00; G01T 1/15; G01J 5/00
[52] U.S. Cl. .................. 250/336.1; 250/551; 250/227.11
[58] Field of Search .................. 250/336.1, 551, 227.11
[56] References Cited
  U.S. PATENT DOCUMENTS
  4,281,245 7/1981 Brogardh et al. .................. 250/227
  4,810,873 3/1989 Ammann et al. .................. 250/227
  4,861,978 8/1989 Anderson .................. 250/214 A OTHER PUBLICATIONS
K. K. Denki Shoin, Eycyclopedia of Electrical and Electronics Engineering, Sep. 1982, pp. Cover/Title, 306-308.

Primary Examiner—Constantine Hannaher
Assistant Examiner—Edward J. Glick
Attorney, Agent, or Firm—Bernard, Rothwell & Brown

[57] ABSTRACT

Described is herein a radiation measuring apparatus in which a detected pulse signal having a wave height value proportional to energy of radiation is transmitted through an optical fiber and a detected pulse signal received from the optical fiber is supplied to an external apparatus. Even if the transmission loss of the optical fiber is subjected to change with passage of time, a monitor pulse signal having a polarity reverse to that of a detected pulse signal is overlapped on the detected pulse signal lest the wave height of the detected pulse signal be not varied on the transmitting side, and a wave height value of a monitor pulse signal passed through the optical fiber is detected to compensate the wave height of the received detected pulse signal using the detected value.

4 Claims, 2 Drawing Sheets

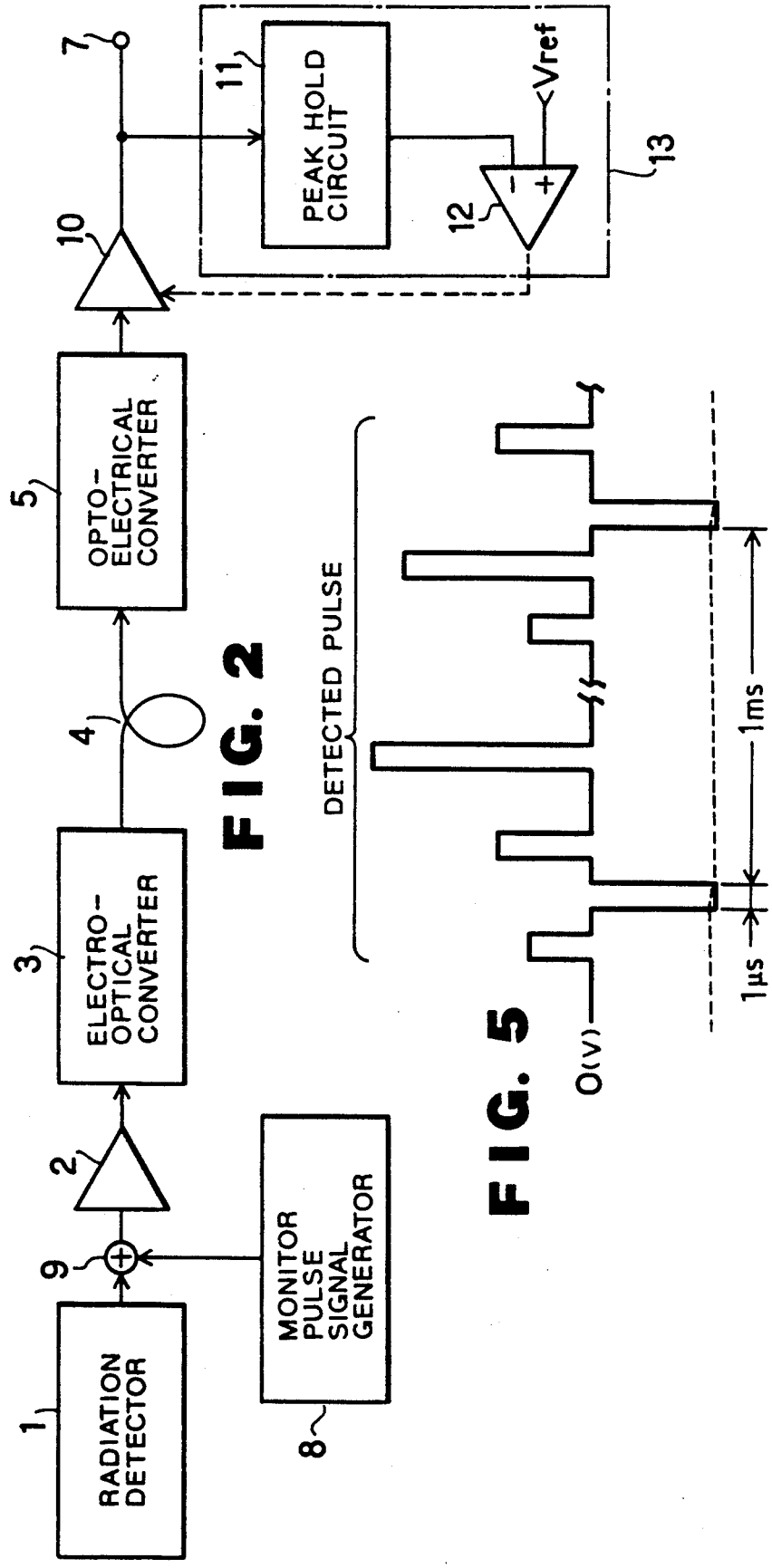

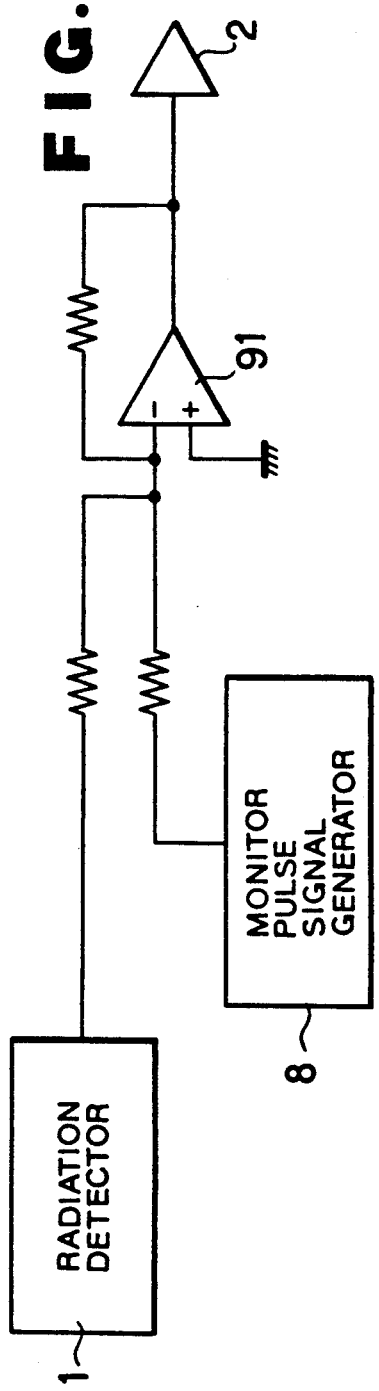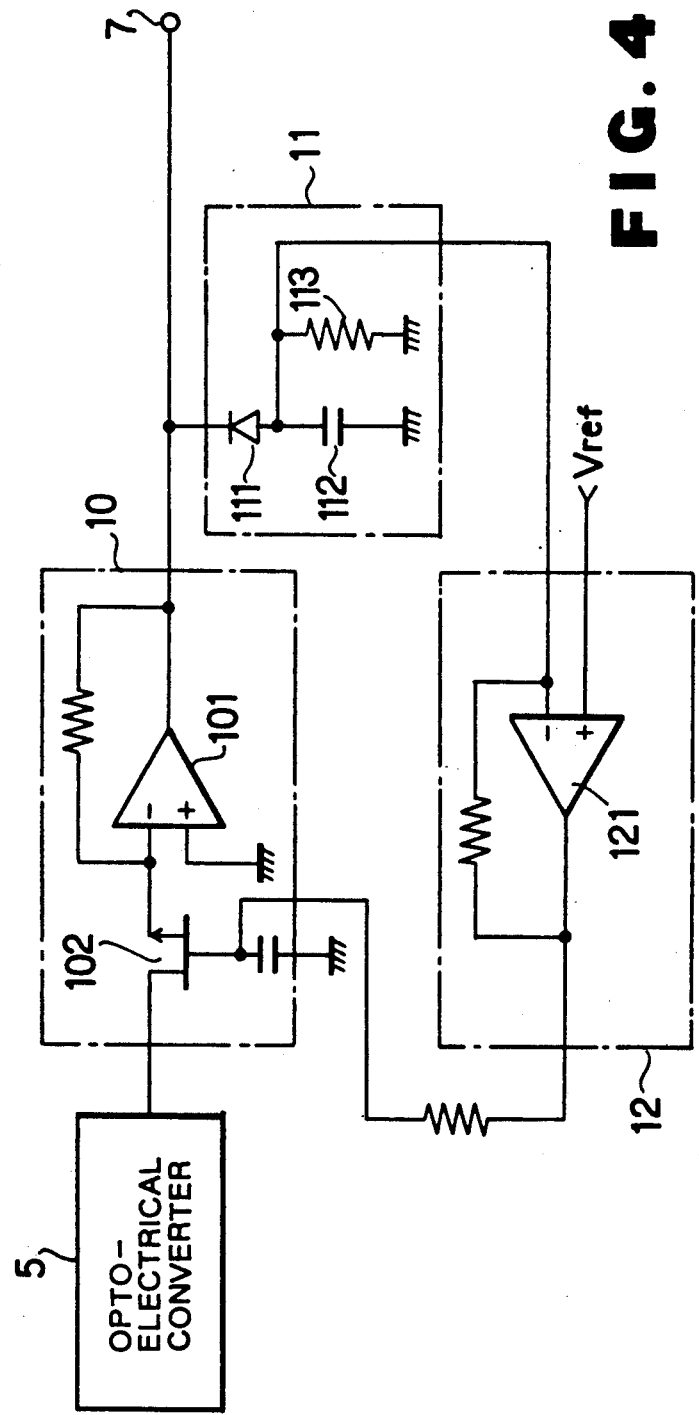

RADIATION MEASURING APPARATUS

BACKGROUND OF THE INVENTION

1. Field of the Invention

The present invention relates to a radiation measuring apparatus which is designed so as to transmit detected signals obtained from a radiation detector using an optical fiber.

2. Description of the Prior Art

FIG. 1 is a block diagram showing a conventional radiation measuring apparatus. In FIG. 1, reference numeral 1 is a radiation detector which outputs a detected pulse signal having a pulse height in accordance with the detected radiation energy, 2 an amplifier which amplifies the detected pulse signal obtained from the radiation detector 1, 3 an electro-optical converter such as a light emitting diode or a laser diode which converts the detected pulse signal amplified by the amplifier 2 into an optical signal, 4 an optical fiber which transmits the optical signal obtained from the electro-optical converter 3, 5 an opto-electrical converter such as a photo diode which converts the optical signal transmitted through the optical fiber 4 into an electrical signal, 6 an amplifier which amplifies the detected pulse signal obtained from the opto-electrical converter 5, and 7 an output terminal from which the detected pulse signal amplified by the amplifier 6 is output.

Next, the operation will be described. The radiation detector 1 detects radiation and outputs a detected pulse signal. The detected pulse signal has a fixed polarity, and its pulse height is proportional to the energy of the detected radiation. The frequency of generation of the detected pulse signal is proportional to intensity of the detected radiation. After being amplified by the amplifier 2, the detected pulse signal is converted into an optical pulse signal by the electro-optical converter 3. After being transmitted through the optical fiber 4, the optical pulse signal is converted back into an electric pulse signal by the opto-electrical converter 5, and further amplified by the amplifier 6 to be supplied to the output terminal 7. The detected pulse signal obtained from the output terminal 7 is sent to a counter circuit or a pulse height analyzer provided in the following stage though not shown, and used for measurement of intensity of detected radiation or distribution of energy and the like.

Since a conventional radiation measuring apparatus is constituted as described above, the transmission loss of the optical fiber 4 is subject to change with the passage of time and consequently, sometimes the pulse height of the detected pulse signal obtained at the output terminal 7 varies as a result thereof. This has been a very important problem from the viewpoint of measuring energy of detected radiation based on the pulse height of the detected pulse signal.

SUMMARY OF THE INVENTION

The present invention is directed toward solving such problems as described above, and its object is to provide a radiation measuring apparatus in which the pulse height of the detected pulse signal does not vary even if the transmission loss of the optical fiber varies.

In a radiation measuring apparatus according to the present invention, the detected pulse signal is added to a monitor pulse signal of polarity reverse thereto, and having a fixed wave height value for detecting variations in transmission loss of the optical fiber and then transmitted. On the receiving side the pulse height of only the monitor pulse signal is detected and the detected signal is fed back to a gain controlled amplifier, controlling the monitor pulse signal so as to hold its pulse height constant.

BRIEF DESCRIPTION OF THE DRAWINGS

FIG. 1 is a block diagram showing a conventional radiation measuring apparatus;

FIG. 2 is a block diagram showing a radiation measuring apparatus according to the present invention;

FIG. 3 is a circuit diagram showing an example of the adder shown in FIG. 2;

FIG. 4 is a circuit diagram showing an example of a gain controlled amplifier, a peak hold circuit, and an error detecting amplifier shown in FIG. 2; and FIG. 5 is a waveform diagram showing an example of an output signal of the gain controlled amplifier.

DETAILED DESCRIPTION OF THE PREFERRED EMBODIMENT

Hereinafter, an embodiment according to the present invention will be described with reference to the drawings. In FIG. 2, parts corresponding to those in FIG. 1 are identified by the same symbols and numerals, and the description of them will be omitted. In FIG. 2, reference numeral 8 is a monitor pulse signal generator which generates a monitor pulse signal of polarity reverse to that of a detected pulse signal obtained from the radiation detector 1 with a fixed period. Reference numeral 9 is an adder which adds the detected pulse signal and the monitor pulse signal, 10 a gain controlled amplifier which is supplied with the signal output from the opto-electrical converter 5, 11 a peak hold circuit which extracts only the monitor pulse signal from the output signal of the gain controlled amplifier 10 and holds its pulse height value, 12 an error detecting amplifier which compares the wave height value held by the peak hold circuit 11 with a reference voltage Vref and controls the gain controlled amplifier 10 using the detected signal thereof. Reference numeral 13 is a monitor pulse signal detecting circuit composed of the peak hold circuit 11 and the error detecting amplifier 12.

Next, the operation will be described. The detected pulse signal obtained from the radiation detector 1 and the monitor pulse signal obtained from the monitor pulse signal generator 8 are combined and added in the adder 9. FIG. 3 is a circuit diagram showing an example of the adder 9 using an operational amplifier 91. The monitor pulse signal has, for example, a period of 1 msec, a pulse width of 1 $\mu$sec and a fixed pulse height, and is a pulse sequence of polarity reverse to that of the detected pulse signal. The monitor pulse sequence can be easily produced by an oscillating circuit such as an astable multivibrator. After being converted by the electro-optical converter 3, the output signal of the amplifier 2 is transmitted through the optical fiber 4, and further converted by the opto-electrical converter 5 into an electrical signal and then amplified by the gain controlled amplifier 10. The peak hold circuit 11 extracts the monitor pulse signal from among the output signal in which the detected pulse signal obtained from the gain controlled amplifier 10 and the monitor pulse signal are mixed, and then holds the pulse height of the monitor pulse signal.

Since the monitor pulse signal is provided with the polarity reverse to that of the detected pulse signal, the above-mentioned extraction can be easily carried out. Also, the monitor pulse signal can be always discriminated from the detected pulse signal. Accordingly, the extraction does not disturb the measurement of the detected pulse signal at all. When the period and the pulse width of the monitor pulse signal are 1 msec and 1 $\mu$sec respectively, the probability that the detected pulse signal randomly overlaps the monitor pulse signal unluckily is only 1/1000. Such accidental overlap of the pulses provides an influence to the monitor pulse signal itself. But, the result is only disappearance of the monitor pulse signal or only the absence of one portion of the pulse and does not cause in increase of the pulse height. When the peak hold circuit 11 receives a pulse having a pulse height smaller than that of the preceding pulse, it neglects the pulse. The above-mentioned absence of the monitor pulse signal does not, therefore, influence the output of the peak hold circuit 11. This is an advantage based on the fact that the monitor pulse signal is provided with the polarity reverse to that of the detected pulse signal.

Next, the error detecting amplifier 12 amplifies the difference between the output voltage of the peak hold circuit 11 and the reference voltage Vref and negatively feeds back the gain of the gain control amplifier 10 using the amplified output, thereby controlling the peak hold circuit 11 so as to always hold its output voltage constant. Consequently, the pulse height of the monitor pulse signal in the output signal of the gain controlled amplifier 10 is held constant, and therefore, variations in the transmission loss of the optical fiber 4 are compensated to always hold the composite gain of a series of a measuring system from the monitor pulse signal generator 8 up to the output terminal 7 constant. Accordingly, even if the transmission loss of the optical fiber 4 varies, the detected pulse signal is amplified by the always constant composite gain to appear at the output terminal 7.

FIG. 4 shows a circuit diagram of an example comprising the gain controlled amplifier 10, the peak hold circuit 11, and the error detecting amplifier 12. FIG. 5 shows a waveform diagram of one example of the output signal of the gain controlled amplifier 10. In FIG. 4, reference numeral 101 is an amplifier, 102 a FET used as a variable resistive element, 111 a diode, 112 a capacitor, 113 a resistor, and 121 an operational amplifier. In FIG. 5, the broken line shows a manner in which the pulse height value of the monitor pulse signal is held.

The pulse height value of the received monitor pulse signal is held by the capacitor 112, and the held pulse height value is input to the operational amplifier 121. The output signal of the operational amplifier 121 obtained as the result of the comparison between the input voltage to the operational amplifier and the reference voltage Vref is input to the gate of the FET 102. In short, the gate voltage of the FET 102 is controlled to control the amplification factor of the amplifier 101.

What is claimed is:

1. A radiation apparatus comprising
   a radiation detector which outputs a measurement pulse signal having a pulse height in accordance with detected radiation energy;
   a monitor pulse signal generator which generates a monitor pulse signal having a polarity reverse to that of said measurement pulse signal and a pulse height of a fixed value;
   an adder which adds said measurement pulse signal and said monitor pulse signal;
   an amplifier which amplifies the output signal of said adder;
   an electro-optical converter which converts an output signal of said amplifier into an optical signal;
   an optical fiber which transmits said optical signals;
   an opto-electrical converter which converts an optical signal from said optical fiber into an electrical signal;
   a gain controlled amplifier which is supplied with an output signal of said opto-electrical converter; and
   a monitor pulse signal detecting circuit which detects a wave height of said monitor pulse signal from an output signal of said gain controlled amplifier and controls the gain of said gain controlled amplifier using the detected wave height signal.

2. A radiation measuring apparatus according to claim 1 wherein the monitor pulse signal generator includes an oscillating circuit which oscillates a series of monitor pulses of fixed height, width and period.

3. A radiation measuring apparatus according to claim 2 wherein the monitor pulse signal detecting circuit includes a peak hold circuit which holds a pulse height value of said monitor pulse signal and an error detecting amplifier which amplifies a difference between the held value and a reference voltage.

4. A radiation measuring apparatus according to claim 3 wherein the gain controlled amplifier is an amplifier of which input resistance is controlled by a detected signal output by said error detecting amplifier.

* * * * *

UNITED STATES PATENT AND TRADEMARK OFFICE
CERTIFICATE OF CORRECTION

PATENT NO. : 5,012,097

DATED : April 30, 1991

INVENTOR(S) : Minoru Oda

It is certified that error appears in the above-identified patent and that said Letters Patent is hereby corrected as shown below:

Column 1, line 51, delete "sometimes".

Column 3, line 13, "in" should be --an--.

Signed and Sealed this

Twenty-second Day of September, 1992

Attest:

DOUGLAS B. COMER

*Attesting Officer*      *Acting Commissioner of Patents and Trademarks*